(12) United States Patent
Kim

(10) Patent No.: US 7,216,291 B2
(45) Date of Patent: May 8, 2007

(54) SYSTEM AND METHOD TO DISPLAY TABLE DATA RESIDING IN COLUMNS OUTSIDE THE VIEWABLE AREA OF A WINDOW

(75) Inventor: Steven P. Kim, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/690,037

(22) Filed: Oct. 21, 2003

(65) Prior Publication Data

US 2005/0086586 A1    Apr. 21, 2005

(51) Int. Cl.
G06F 17/00    (2006.01)

(52) U.S. Cl. .................. 715/503; 715/509; 715/517

(58) Field of Classification Search ............ 715/503, 715/784, 509, 853; 345/684
See application file for complete search history.

(56) References Cited

U.S. PATENT DOCUMENTS

| | | | |
|---|---|---|---|
| 4,506,343 A | | 3/1985 | Shipp, Jr. et al. |
| 4,786,897 A * | | 11/1988 | Takanashi et al. ........... 715/799 |
| 5,014,222 A * | | 5/1991 | Donahue ..................... 715/733 |
| 5,038,138 A * | | 8/1991 | Akiyama et al. ............ 345/684 |
| 5,060,170 A * | | 10/1991 | Bourgeois et al. .......... 715/788 |
| 5,208,588 A * | | 5/1993 | Nishiyama ................... 345/590 |
| 5,305,435 A * | | 4/1994 | Bronson ...................... 715/777 |
| 5,442,743 A * | | 8/1995 | Kuno .......................... 715/503 |
| 5,450,536 A * | | 9/1995 | Rosenberg et al. .......... 715/509 |
| 5,574,836 A | | 11/1996 | Broemmelsiek |
| 5,588,099 A * | | 12/1996 | Mogilevsky et al. ........ 715/508 |
| 5,613,131 A * | | 3/1997 | Moss et al. .................. 715/509 |
| 5,790,118 A * | | 8/1998 | Bertram ...................... 715/744 |
| 5,808,914 A * | | 9/1998 | Shin et al. ..................... 703/2 |
| 5,812,131 A * | | 9/1998 | Bertram ...................... 715/798 |
| 5,844,559 A * | | 12/1998 | Guha ........................... 715/846 |
| 5,844,569 A * | | 12/1998 | Eisler et al. ................. 345/619 |
| 5,847,706 A * | | 12/1998 | Kingsley ..................... 715/788 |
| 6,065,022 A * | | 5/2000 | Ueki ........................... 715/503 |
| 6,185,582 B1 * | | 2/2001 | Zellweger et al. ........... 715/503 |
| 6,185,589 B1 * | | 2/2001 | Votipka ....................... 715/517 |
| 6,199,080 B1 * | | 3/2001 | Nielsen ....................... 715/513 |
| 6,202,060 B1 * | | 3/2001 | Tran ............................. 707/3 |
| 6,225,996 B1 * | | 5/2001 | Gibb et al. .................. 715/784 |

(Continued)

OTHER PUBLICATIONS

Baudisch, "Halo: A Virtual Periphery for Small Screens Devices", Microsoft Research, 2004, 5 pages.*

*Primary Examiner*—Doug Hutton
*Assistant Examiner*—James H Blackwell
(74) *Attorney, Agent, or Firm*—Coats & Bennett, P.L.L.C.

(57) ABSTRACT

A portion of a table is displayed in a window having a viewable area. For at least one row, information from one or more columns outside the viewable area of the window is displayed in a hovering row, which may be displayed below the associated row. Column headers may be displayed with the hovering row. The hovering row is dynamically displayed or not displayed in response to user input, such as moving a cursor over an icon associated with the row. Static display of the hovering row is toggled in response to user input, such as (de)selecting a toggle button icon associated with the row. The hovering row is not displayed if all information in columns outside the viewable window area cannot be displayed.

18 Claims, 3 Drawing Sheets

U.S. PATENT DOCUMENTS

| | | | |
|---|---|---|---|
| 6,252,597 B1 * | 6/2001 | Lokuge | 715/841 |
| 6,256,649 B1 * | 7/2001 | Mackinlay et al. | 715/503 |
| 6,313,848 B1 * | 11/2001 | Hoag | 345/684 |
| 6,035,309 A1 | 3/2002 | Dauerer et al. | |
| 6,397,259 B1 * | 5/2002 | Lincke et al. | 709/236 |
| 6,639,611 B1 * | 10/2003 | Leduc | 715/764 |
| 6,750,886 B1 * | 6/2004 | Bergstedt | 715/784 |
| 6,828,988 B2 * | 12/2004 | Hudson et al. | 715/711 |
| 6,839,575 B2 * | 1/2005 | Ostergaard | 455/566 |
| 6,868,528 B2 * | 3/2005 | Roberts | 715/853 |
| 6,907,580 B2 * | 6/2005 | Michelman et al. | 715/856 |
| 6,976,226 B1 * | 12/2005 | Strong et al. | 715/788 |
| 7,000,181 B2 * | 2/2006 | Press | 715/503 |
| 7,143,340 B2 * | 11/2006 | Brid | 715/504 |
| 2002/0095405 A1 | 7/2002 | Fujiwara | |
| 2002/0122080 A1 * | 9/2002 | Kunii et al. | 345/864 |
| 2002/0188774 A1 * | 12/2002 | Lessard | 710/52 |
| 2003/0025737 A1 * | 2/2003 | Breinberg | 345/801 |
| 2003/0188259 A1 * | 10/2003 | Aureglia et al. | 715/503 |
| 2003/0189594 A1 * | 10/2003 | Jones | 345/764 |
| 2004/0095400 A1 * | 5/2004 | Anderson et al. | 345/864 |
| 2004/0100510 A1 * | 5/2004 | Milic-Frayling et al. | 345/864 |
| 2005/0034060 A1 * | 2/2005 | Kotler et al. | 715/503 |
| 2005/0076292 A1 * | 4/2005 | von Tetzchner et al. | 715/513 |
| 2005/0086610 A1 * | 4/2005 | Mackinlay et al. | 715/817 |
| 2006/0020904 A1 * | 1/2006 | Aaltonen et al. | 715/850 |
| 2006/0026498 A1 * | 2/2006 | Hays et al. | 715/503 |
| 2006/0026499 A1 * | 2/2006 | Weddle | 715/503 |

* cited by examiner

Simple Table Demo

| First Name | Last Name | Sport | # of Years | Vegetarian |
|---|---|---|---|---|
| Mary | Campione | Snowboarding | 5 | false |
| Alison | Huml | Rowing | 3 | true |
| Kathy | Walrath | Chasing toddlers | 2 | false |
| Sharon | Zakhour | Speed reading | 20 | true |
| Angela | Lih | Teaching high s ... | 4 | false |

SYSTEM AND METHOD TO DISPLAY TABLE DATA RESIDING IN COLUMNS OUTSIDE THE VIEWABLE AREA OF A WINDOW

BACKGROUND

The present invention relates generally to the field of software and in particular to a method of displaying data in table columns outside the viewable area of a window.

In a broad variety of software applications, a well known and commonly used structure for displaying data is a two-dimensional table that organizes the data in a series of horizontal rows and vertical columns. For example, tables are often used to display information to user on a computer display device, such as a monitor or screen, either utilizing the full-screen display or in a Graphic User Interface (GUI) window. It is often the case in such displays that the size of the table, i.e., the number of rows and/or columns containing information to be displayed, exceeds the available display space at the selected zoom level and font size. In this case, the software application typically allows the user to scroll the visible, or displayed, portion of the table over a virtual model of the full table, whose extent exceeds the limits of the display.

A number of prior art methods exist to facilitate scrolling, or moving the displayed view of the table over the full extent of the table. For example, GUI windows typically provide vertical and horizontal scroll bars, providing an intuitive graphic means for scrolling the displayed view. Applications that utilize a full-screen display may include commands to scroll the display in vertical and/or horizontal directions, and may automatically scroll the display when the cursor reaches the edge of the displayed view. As another example, some applications may provide a graphic representation of the full extent of a virtual table, indicating the relative size and current position of the displayed portion of the table by a small rectangle within this extent.

The prior art methods of scrolling the displayed portion of a table across the full extent of the table present significant drawbacks. For example, a user may desire to view information within the same row that is located in columns further apart than the horizontal extent of the displayed portion of the table. Consequently, the user must continuously scroll in a horizontal direction to retrieve the desired information. This is cumbersome and inefficient, as it may cause the user to become disoriented and lose track of the relevant information.

SUMMARY OF THE INVENTION

The present invention relates to a method of displaying a table in a window having a viewable area that is smaller than the table being displayed. The method includes displaying a portion of the table in the viewable area of the window, and, for at least one row of the table, displaying information from one or more columns outside the viewable area of the window in a hovering row. The hovering row may be displayed beneath its associated displayed row, and may include column headers. The display of a hovering row associated with each row may be selected by user input, such as by selecting an icon associated with the row.

BRIEF DESCRIPTION OF DRAWINGS

FIG. 2 is a table as seen in the window of a computer display.

FIG. 3 is the table of FIG. 1, depicting less than all columns of the table displayed.

FIG. 4 is a table displaying the data of FIG. 1 in a hovering row according to one embodiment of the present invention.

DETAILED DESCRIPTION OF THE INVENTION

Figure 1:
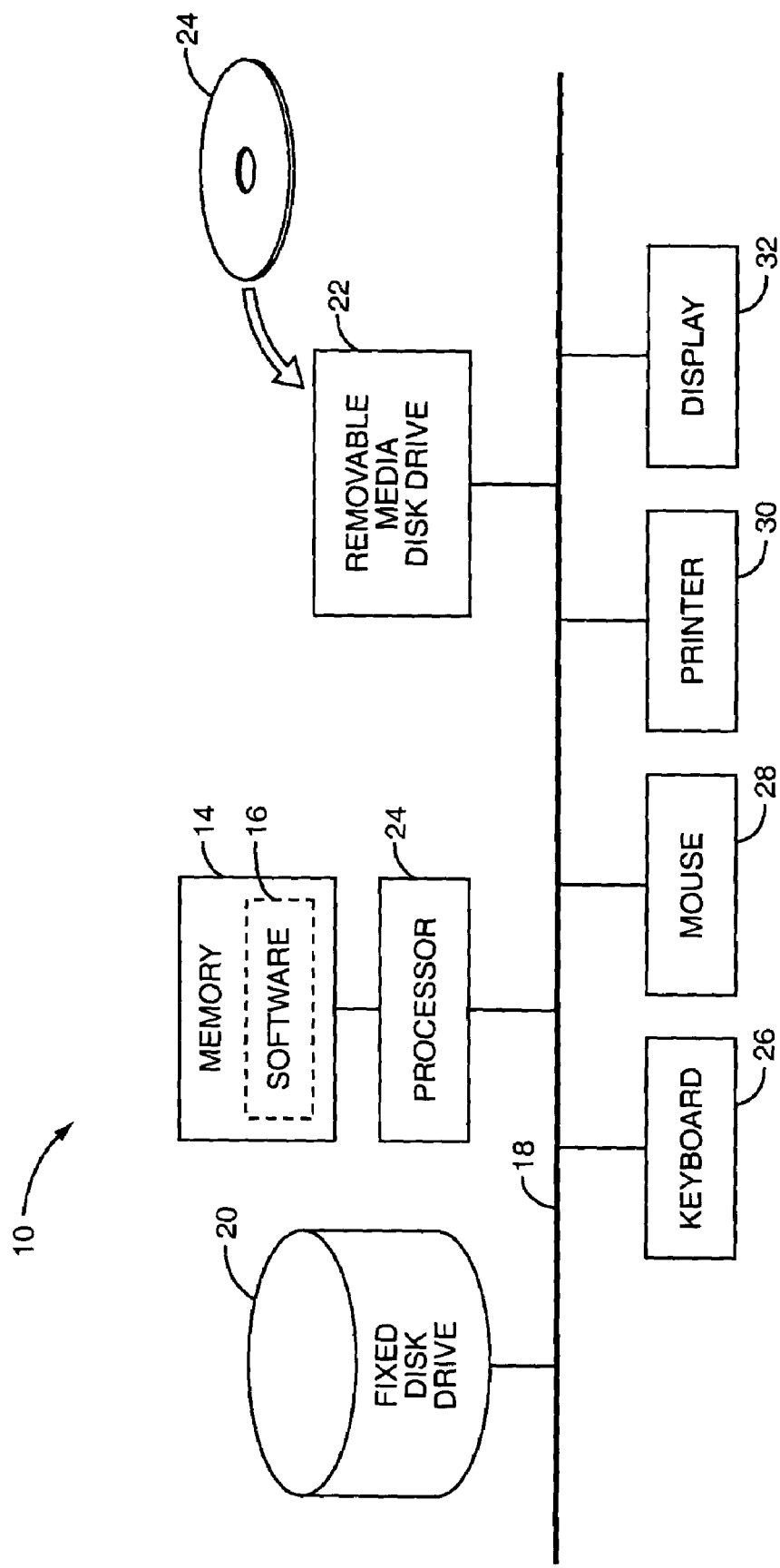
FIG. 1 is a functional block diagram of a representative computer system.

The present invention relates to a method of displaying table information that is in columns outside the viewable area of a window, in a convenient and intuitive manner. The method is particularly useful in software applications that display tabular data to the user of a computer system on the computer system's display device.

FIG. 1 depicts a functional block diagram of a representative computer system, indicated generally by the numeral 10. The computer system 10 includes a processor 12 capable of executing stored instructions. Connected to the processor 12 is memory 14 that, in operation, stores software 16. Software 16 may include, in addition to operating systems and the like, one or more applications that display data to a user in a tabular format. A spreadsheet application is one example of an application that displays tabular data.

The processor 12 is connected to a bus 18, to which are connected a variety of data storage devices and input and output devices. For example, a fixed disk drive 20 containing a computer-readable medium, from which software 16 may be loaded into memory 14, may be attached to the bus 18. Additionally, a removable media disk drive 22 that receives removable computer-readable media 24 may be attached to the bus 18. The removable media 24 may comprise a floppy disk, a CD-ROM or DVD-ROM, a magnetic tape, high-capacity removable media, or the like. Removable media 24 may contain a variety of digital data, and in particular may contain software 16, such as applications that, in operation, display data to a user in a tabular format. The software 16 may be copied from the removable media 24 to the fixed disk drive 20, and subsequently loaded into memory 14 from the fixed disk drive 20. Alternatively, the software 16 may be loaded directly from the removable media 24 into the memory 14.

Also connected to the bus 18 are input devices such as a keyboard 26 and a mouse 28, as well known in the art. The computer system 10 may additionally include output devices such as a printer 30 or display device 32. Display device 32 may comprise a traditional CRT monitor, a liquid crystal display (LCD), or the like.

In operation, software 16 executing on the computer system 10 displays data in a tabular format to a user via the display device 32. FIG. 2 depicts a representative example of such a tabular data display. The table of FIG. 2 is displayed within a GUI window 40. GUI-based operating systems, such as Microsoft's WINDOWS 2000 and Apple Computer's OS X operating system, are well known in the art, and the specifics of the GUI window 40 are not further explicated herein. While the table of FIG. 2 is displayed in a GUI window 40 as an example, the present invention is not limited to such an application. Rather, the present invention finds utility in a broad range of display applications, including non-windowed environments.

The table of FIG. 2 is organized as a plurality of rows 54, 56, 58, 60, and 62, by a plurality of columns 44, 46, 48, 50, and 52. Column headers or labels appear in an uppermost row 32. Typically, the data within each row 54, 56, 58, 60, 62 are associated; and the data within each column 44, 46, 48, 50, 52 are related by type or category, as well known in the art.

Figures 3, 4:
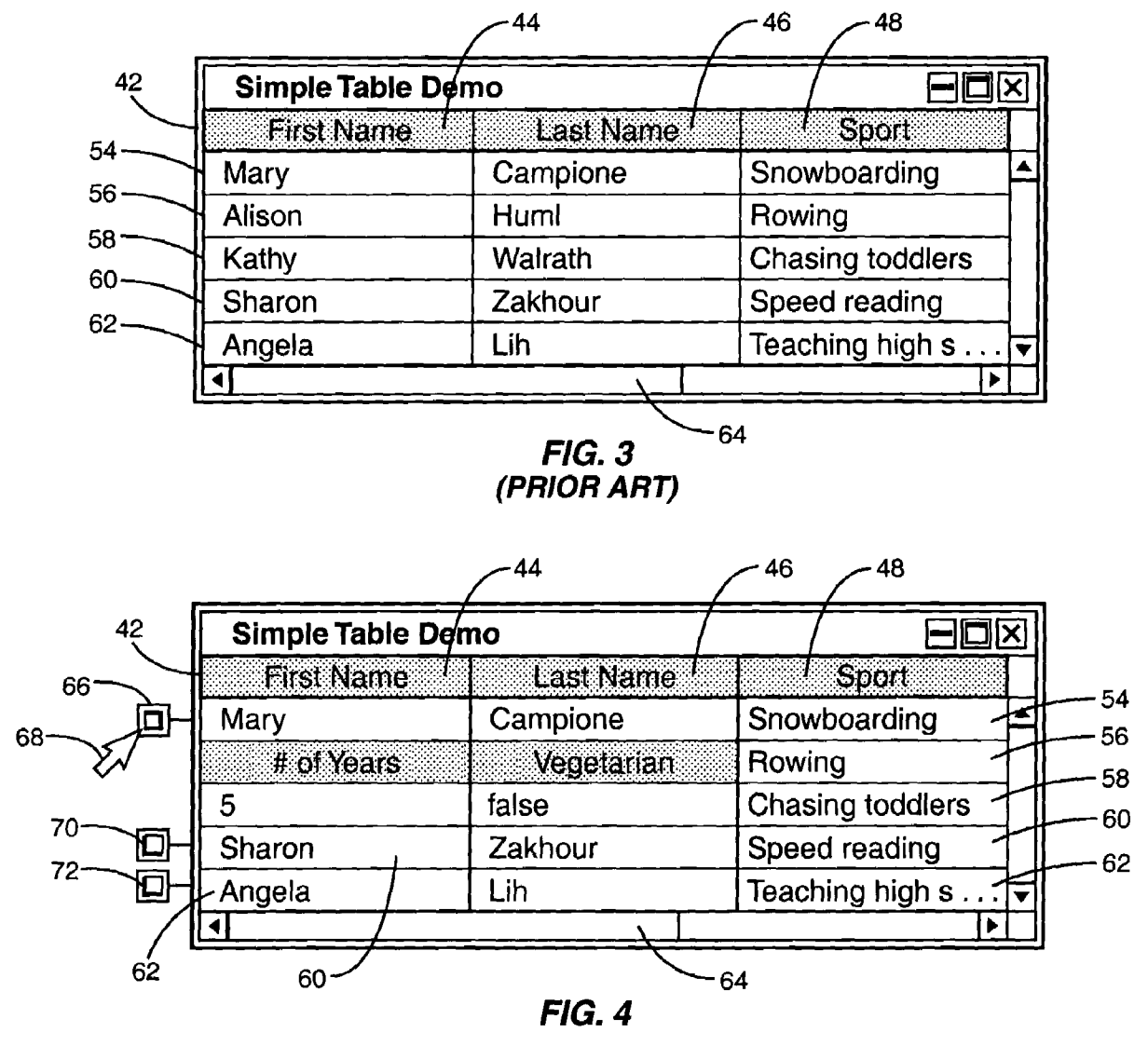

FIG. 3 depicts the case where less than all columns of the table can be displayed within the viewable area of window 40. Rows 54, 56, 58, 60, and 62 are displayed; however, only columns 44, 46, and 48 are displayed. Columns 50 and 52 are not displayed in FIG. 3, as they are outside of the viewable area of the window 40. As is well known in GUI windowing systems, a scroll bar 64 appears in the lower frame of window 40, to facilitate scrolling the viewable region of the table, to bring information outside the viewable area into view. However, this action moves formerly viewable information, such as column 44, outside of the viewable area of the window 40, so that it is no longer displayed. This forces the user to continuously scroll back and forth, for example, to examine the contents of both column 44 and 52.

FIG. 4 depicts a display of the table according to the present invention, where the information of row 54 is displayed in a hovering row 65, which, along with a row 67 of associated column headers, appears below row 54. As used herein, a hovering row is a row or partial row of a table that contains information stored in one or more columns outside of the viewable area of the window displaying the table. The hovering row, and associated column headers, may "hover" over other rows in the table, partially or completely obscuring their contents for the duration of its display. In the embodiment depicted in FIG. 4, the hovering row 65 comprises the information of row 54 stored outside of the viewable area of window 40, in columns 50 and 52, displayed together with their column headers 67, below row 54. With the hovering row 65 displayed, all of the information of row 54 is visible to the user without the necessity of horizontally scrolling the visible window area. In FIG. 4, the hovering row 65 and its column headers 67 cover portions of rows 56 and 58. In other embodiments, the hovering row 65 may be inserted between adjacent rows. If the number of columns outside the viewable area exceeds the viewable row space available to the hovering row 65, then the hovering row 65 is not displayed, and the user must scroll the window 40 as in the prior art. The row or rows for which a hovering row 65 is displayed is selectable, both dynamically and statically.

The dynamic, or temporary, display of a hovering row 65 is controlled by a user input. In one embodiment, as depicted in FIG. 4, a toggle button 66 is displayed adjacent a row 54 for which the display of a hovering row 65 containing information outside the window 40 viewable area is available. Moving the mouse pointer 68 over the toggle button 66 causes the hovering row 65—comprising columns 50 and 52 for row 54—along with associated column headers 67 to be displayed below row 54. When the cursor 68 is moved off of the toggle button 66, the hovering row 65 associated with row 54 is no longer displayed. FIG. 4 depicts toggle buttons 70 and 72, associated with rows 60 and 62, respectively. No toggle button is displayed for rows 56 and 58 while a hovering row 65 associated with row 54 is displayed, as the hovering row 65 and its column headers 67 obscure part of rows 56 and 58.

Alternatively, a hovering row 65 associated with a row, such as row 54, be statically displayed by activating the associated toggle button 66, such as with a mouse click, when the cursor 68 is positioned over the toggle button 66. This toggles the toggle button from an unselected mode, as depicted by toggle buttons 70 and 72, to a selected mode, as depicted by toggle button 66. When the toggle button 66 is selected, a hovering row 65 containing information from columns outside the viewable area of the window 40 is statically displayed. That is, the hovering row 65 remains displayed as the cursor 68 is moved off of the toggle button 66. In this manner, a plurality of rows 54, 56, 58, 60, 62 may simultaneously have a hovering row associated therewith displayed (subject to the constraint in the embodiment of FIG. 4 that immediately adjacent rows cannot simultaneously display hovering rows, as the hovering row associated with one row partially obscures information in an adjacent row).

As will be readily apparent to one of ordinary skill in the art, both the dynamic and static (i.e., toggled) display of hovering rows 65 may be initiated and controlled by a broad variety of user inputs, and is not necessarily restricted to the hovering over, or mouse-click selection of, toggle buttons 66, 70, 72 as depicted in FIG. 4. For example, pressing the ALT key while the mouse cursor 68 is positioned anywhere over a given row 54, 56, 58, 60, 62 may dynamically display a hovering row 65 containing information residing outside of the viewable window area. Similarly, holding the ALT key while performing a mouse click may toggle the static display of a hovering row 65 associated with the row over which the mouse cursor 68 is positioned. A broad variety of other user inputs may be configured to perform these functions, within the broad practice of the present invention.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of displaying a table having a plurality of rows and columns in a window, comprising:
    displaying a portion of a two-dimensional table comprising a plurality of rows and columns in a viewable area of said window; and
    for at least one row of said table in said displayed portion, displaying information obtained from one or more of said columns located outside said viewable area of said window, wherein said information is displayed in a hovering row adjacent to said at least one row in the same viewable area of said window.

2. The method of claim 1 wherein said hovering row is displayed below said displayed row.

3. The method of claim 1 further comprising displaying column headers above said hovering row.

4. The method of claim 1 wherein said hovering row is dynamically displayed or not displayed, in response to a user input.

5. The method of claim 4 wherein said user input comprises moving a mouse pointer over an icon associated with said displayed row.

6. The method of claim 1 wherein the static display of said hovering row is toggled in response to a user input.

7. The method of claim 6 wherein said user input comprises the (de)selection of a toggle button icon associated with said displayed row.

8. The method of claim 1 wherein said hovering row is displayed only if all columns outside said viewable area can be displayed in said hovering row.

9. A system for displaying information in a table, comprising:
- a display device displaying a window having a viewable area;
- an input device;
- memory; and
- a processor programmed to:
  - display a portion of a two-dimensional table comprising a plurality of rows and columns in said viewable area of said window; and
  - for at least one row of said table in said displayed portion,
    - displaying information obtained from one or more of said columns located outside said viewable area of said window, wherein said information is displayed in a hovering row adjacent to said at least one row, in the same viewable area of said window.

10. The system of claim 9 wherein said processor is programmed to display a plurality of rows, and wherein the display of a hovering row associated with each displayed row is dynamically selectable.

11. The system of claim 10 wherein a user input via said input device toggles the display of a hovering row associated with each displayed row of said table.

12. The system of claim 11 wherein said user input comprises the selection of an icon associated with each displayed row of said table.

13. The system of claim 9 wherein said hovering row is displayed only if all columns outside said viewable area can be displayed in said hovering row.

14. A computer-readable medium which stores computer-executable process steps for displaying a table in a window having a viewable area, said computer-executable process steps causing a computer to perform the steps of:
- displaying a portion of a two-dimensional table comprising a plurality of rows and columns in a viewable area of said window; and
- for at least one row of said table in said displayed portion, displaying information obtained from one or more of said columns located outside said viewable area of said window, wherein said information is displayed in a hovering row adjacent to said at least one row, in the same viewable area of said window.

15. The computer-readable medium of claim 14 wherein said computer-executable process steps cause said computer to display a plurality of rows, and wherein the display of a hovering row associated with each displayed row is dynamically selectable.

16. The computer-readable medium of claim 15 wherein a user input toggles the display of a hovering row associated with each displayed row of said table.

17. The computer-readable medium of claim 16 wherein said user input comprises the selection of an icon associated with each displayed row of said table.

18. The computer-readable medium of claim 14 wherein said hovering row is displayed only if all columns outside said viewable area can be displayed in said hovering row.

* * * * *